Jan. 21, 1969     W. S. BARRON     3,422,930

HAND TRUCK WITH BRAKE

Filed March 22, 1967

INVENTOR.
WILLIAM S. BARRON
BY Eugene W. Eckelman
ATTORNEY

United States Patent Office 3,422,930
Patented Jan. 21, 1969

3,422,930
HAND TRUCK WITH BRAKE
William S. Barron, 7936 N. Wayland,
Portland, Oreg. 97203
Filed Mar. 22, 1967, Ser. No. 625,057
U.S. Cl. 188—22  3 Claims
Int. Cl. B62b 5/04; B60t 1/06

ABSTRACT OF THE DISCLOSURE

A hand truck with a brake serving to control wheeling movement thereof. The hand truck mentioned herein is of the two wheel type and is used by workmen to pick up and transport articles. The brake on the hand truck includes a movable cross member which operates a pair of straps capable of applying a braking force to brake drums on the hand truck wheels. The cross member is moved vertically by a flexible link connected between the cross member and a brake operating lever terminating in an auxiliary handle adjacent to a gripping handle for the hand truck.

BACKGROUND OF THE INVENTION

This invention relates to new and useful improvements in hand trucks and particularly to those hand trucks of the type which have brake means as a part thereof.

Hand trucks have heretofore been provided with brake means for controlling the wheeled operation of the hand truck. Such prior devices are not practical in that they are complex in their construction, expensive to manufacture, and are not easily operated by the workmen. In addition, brake means have not heretofore been provided which are easily attached to existing hand trucks or which are readily adaptable for use with hand trucks of present manufacture.

SUMMARY OF THE INVENTION

Accordingly, applicant's invention is directed to a hand truck having as its primary objective to include brake means which are simplified in construction, inexpensive to manufacture, and easily operated by the workmen. In addition, the brake means for the hand truck may be readily attached to existing hand trucks and furthermore is adaptable for manufacture with hand trucks of present day construction. Another feature or objective of applicant's invention is that operating means for the brakes is located adjacent to the gripping handle of the hand truck so that a workman can operate the brakes with the same hand that he uses to grip the handle of the hand truck.

DESCRIPTION OF THE PREFERRED EMBODIMENT

Figure 2:
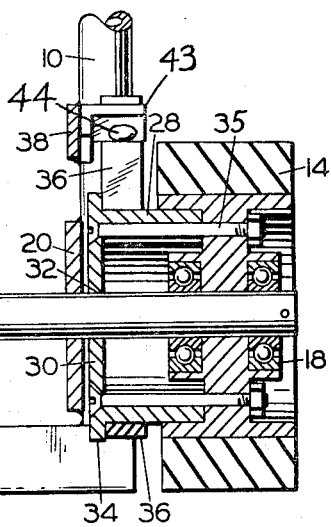
FIGURE 2 is an enlarged, fragmentary sectional view taken on the line 2—2 of FIGURE 1.

Referring now in particular to the drawings, a hand truck of conventional construction comprises an upright frame 10 which is of inverted U-shaped construction and which has a forward projecting load engaging blade 12 secured to the lower end thereof. The hand truck has a pair of wheels 14 rotatably supported on a shaft 16 by suitable bearings 18, FIGURE 2. In one form of construction and as illustrated herein, rearwardly extending frame plates 20 are secured to the frame 10 on opposite sides thereof and support the shaft 16. Secured to the plates 20 are upright legs 22 each having a portion thereof extending up from the said plates parallel to the frame 10 and an angled portion at its upper end for securement to the frame. The legs 22 thus comprise a part of the hand truck frame and serve as slides for operating the hand truck up and down steps or over other irregularities.

Hand trucks of the type described also have a center, upright frame member 24 terminating at its upper end in a horizontal, rearwardly extending handle 26.

Figure 1:
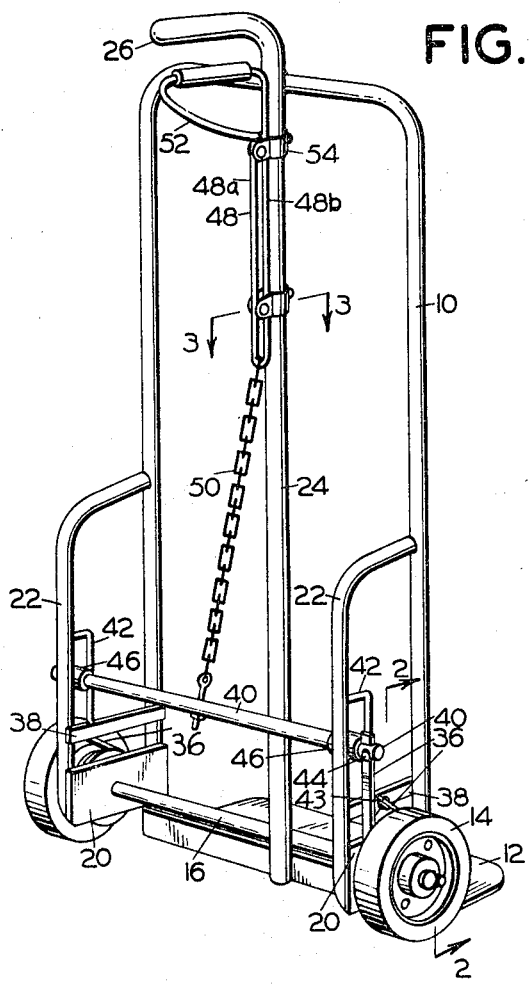
FIGURE 1 is a perspective view of the present hand truck, taken from the rear of the truck.

The hand truck brake means shown and described herein may be combined with a hand truck of the type shown in FIGURE 1, although it is to be understood that the principles of the present invention may be incorporated in other types of hand trucks, as will be more apparent hereinafter. Basically, the invention comprises providing the wheels 14 of a hand truck with brake drums 28 projecting laterally from the inner side of the wheel. The outer ends of the drums with relation to their respective wheels have an end wall 30 provided with an aperture 32 for rotatably receiving the shaft 16 and having an edge extension 34 which forms an outer flange on the drum. Securement of the drum to the wheel may be accomplished by bolts 35, or of course such drums may be formed as an integral part of the wheel. The particular construction of the drum and its attaching bolts 35, shown in FIGURE 2, facilitate attachment of the drum to existing wheels 14.

Brake drums 28 are each associated with a strap or band 36 adapted to exert a pressured friction engagement on the surface of the drum for accomplishing a braking function of the wheels. The straps 36 are secured at one of their ends to auxiliary frame pieces 38 extending between the frame 10 and the legs 22, and are secured at their other ends to the ends of a cross member 40 adapted for vertical movement in upright guide frames 42. Securement of the straps 36 to the frame pieces at the one end of the straps is accomplished by brackets 43 welded or otherwise secured to the outer side of said frame pieces, the straps being secured to the brackets by suitable fasteners 44. In a preferred arrangement, the brackets 43 are located rearwardly with relation to the front of the drums 28 so that the straps will have a wrap almost fully around the drums to provide a good braking effect. Also since the stationary end of straps 36 is forwardly of the end connected to the cross member 40, the forward motion of the wheels will assist in tightening the straps when braking.

The guide frames 42 comprise right angle members secured in an upright position between the frame pieces 38 and the legs 22. The cross member 40 is confined against lateral displacement from the guide frames 42 by the straps 36. These straps may be secured to the cross member 40 in any suitable manner such as by the projection thereof through apertures in the cross member and an anchoring connection therein by fasteners 44. Mounted on the cross member 40 adjacent to its ends are resilient collars 46 serving to prevent rattling of the cross member 40 against other metal parts.

The cross member 40 is operated in its brake applying functions by a brake operating lever 48 connected thereto by a flexible link 50 such as a chain or cable. Lever 48 has a rearwardly extending upper handle portion or loop 52 disposed in closely spaced and parallel relation with the gripping handle 26. In the non-braking position of the lever, it is spaced a short distance, such as an inch or two, below the handle 26. By means of such positioning, the brake handle 52 can be easily grasped by the same hand that grasps the handle 26. Thus, as the workman manipulates the hand truck, with one hand usually on the load and the other hand on the handle 26, he can operate the brake by extending the fingers of the gripping hand down into gripping relation with the handle 52. By squeezing the handles 26 and 52 together, the straps 36 are tightened on the drums 28 and a braking force is applied to the wheels. Disengagement of the brakes is accomplished by a gravity movement of the parts downwardly upon release of the handles 52.

Figure 3:
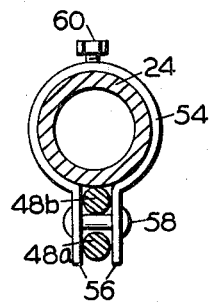
FIGURE 3 is an enlarged, fragmentary sectional view taken on the line 3—3 of FIGURE 1.

Lever 48, in a preferred construction thereof, is formed of a single piece of bar stock bent back upon itself at its lower end to form parallel body portions 48a and 48b. The portion 48b extends upwardly beyond the upper end of portions 48a and is bent into a loop forming the handle 52. Slidable support of the lever 48 on the center frame member 24 of the hand truck is accomplished by clamp members 54 which encircle in part the frame member 24 and have a pair of outwardly projecting extensions 56, FIGURE 3, between which the two portions 48a and 48b of the lever 48 are confined. Extensions 56 are connected together in spaced relation by a rivet 58 or the like, and although the latter is designed to hold the extensions 56 together the spacing therebetween is such that the lever has free vertical movement. Clamps 54 are anchored on the frame member 24 against vertical movement by set screws 60.

In accordance with the present invention there is thus provided a hand truck having brake means which are simplified in construction and inexpensive to manufacture. These brake means also are convenient in operation by the workman in that while operating means therefor is not in the way for normal usage of the truck, such operating means is readily available for operation by the same hand that grips the handle 26. If the hand truck is of the construction shown in FIGURE 1, it is only necessary in applying the present brakes thereto, to equip the wheels 14 with drums 28, weld or otherwise secure the guide frame 42 in place, and attach the straps 36 to the cross member 40 and frame pieces 38. Also, the brake operating lever 48 is mounted on the frame member 24 in a selective position wherein the brake operating handle 54 is adjacent to the handle 26. It is possible that the brake of the present invention may be applied to other types of hand trucks such as those which do not employ legs 22, in which case the cross member 40 could as well be confined in guide frames 42 secured to the frame 10 and the one end of the straps 36 also secured to said frame 10. Also, the brake handle 52 is located wherever the handle 26 is located, whether or not the latter is in middle or off to one side. That is, if the handle 26 is at one side of the truck the handle 52 is mounted adjacent thereto and the lever 48 could as well be mounted on the frame 10.

Having thus described my invention, I claim:
1. A hand truck comprising:
 (a) a frame,
 (b) a gripping handle at the upper end of said frame,
 (c) a pair of wheels mounted at the lower end of said frame at opposite sides of the latter,
 (d) a brake drum on said wheels,
 (e) a vertically movable cross member,
 (f) a strap for each brake drum having one end attached to said cross member,
 (g) said straps extending around their respective drums and having their other ends secured to said frame whereby said straps are tightened around said drums upon upward movement of said cross member to apply a braking force to the brake drums,
 (h) a brake operating lever slidably mounted on said frame for vertical movement,
 (i) the upper end of said lever terminating in an auxiliary handle disposed adjacent to said gripping handle,
 (j) and a flexible link connected at one of its ends to the lower end of said brake operating lever and at its other end to said cross member intermediate the ends of the latter whereby said cross member is operated in its vertical movement by vertical movement of said brake operating lever,
 (k) said flexible link permitting free rocking movement of said cross member relative to the horizontal in the application of the brakes.

2. A hand truck comprising:
 (a) an upright frame,
 (b) a pair of rear legs secured to said frame and extending substantially parallel with said frame,
 (c) a gripping handle at the upper end of said frame,
 (d) a pair of wheels mounted at the lower end of said frame,
 (e) a brake drum on at least one of said wheels,
 (f) a vertically movable cross member mounted on said frame above said wheels,
 (g) a strap having one end attached to said cross member,
 (h) said strap extending around said drum and having its other end secured to said frame above said wheel whereby said strap is tightened around said drum upon upward movement of said cross member to apply a braking force to the brake drum,
 (i) guide frames on said legs guiding the vertical movement of said cross member,
 (j) and a brake operating lever slidably mounted on said frame for vertical movement,
 (k) one end of said lever being operably connected to said cross member and the other end terminating in an auxiliary handle adjacent to said gripping handle.

3. The hand truck of claim 2 wherein each of said wheels has a brake drum and a brake applying strap, said cross member extending from one side of said frame to the other and said straps being connected to said cross member adjacent opposite ends of the latter.

References Cited
UNITED STATES PATENTS

| | | | |
|---|---|---|---|
| 850,730 | 4/1907 | Carr | 188—17 |
| 1,237,799 | 8/1917 | Mays | 188—17 |
| 3,276,550 | 10/1966 | Honeyman | 188—19 X |

MILTON BUCHLER, *Primary Examiner.*

T. W. BUCKMAN, *Assistant Examiner.*

U.S. Cl. X.R.
188—17, 19